Patented Nov. 22, 1949

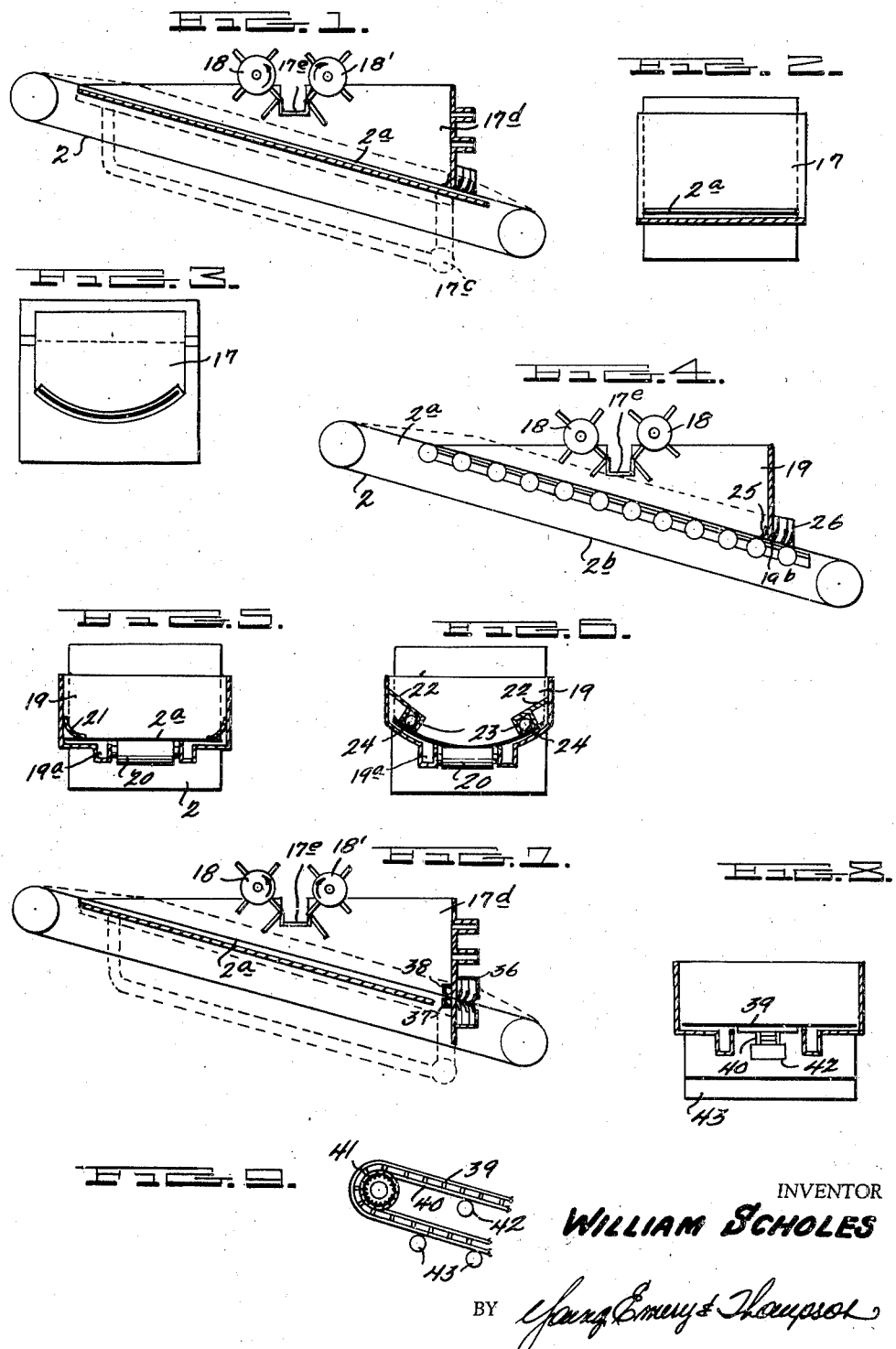

2,489,161

UNITED STATES PATENT OFFICE 2,489,161

GRAVITY LIQUID SEPARATOR

William Scholes, Shotley Bridge, England

Application May 23, 1945, Serial No. 595,407
In Great Britain August 19, 1943

4 Claims. (Cl. 209—173)

This invention consists in a tank for use in the treatment of granular or lump material by means of a liquid medium, of the kind in which the means for conveying the heavier material comprises an endless belt conveyor which enters the tank at one end below the level of the liquid.

It is the object of the invention to provide means whereby the leakage of liquid medium between the tank walls and the belt conveyor may be reduced to a minimum so that the hydrostatic head of the liquid medium may be maintained.

The tank according to the invention comprises two side walls, one end wall and an inclined floor, said walls and floor being adapted to contain a body of liquid medium of a depth sufficient for float and sink separation to take place, said floor supporting and being traversed by the carrying portion of an imperforate homogeneously pliant endless belt conveyor, which carrying portion has a substantially smooth surface, enters the tank through an opening at the base of the end wall, and extends at least to the liquid level for discharging the material settled thereon, and resilient sealing means mounted on said end wall above said opening, said sealing means pressing with continuously rubbing contact on said carrying portion for maintaining the necessary hydrostatic head of the liquid medium in the tank.

Pulleys or rollers are provided for driving and guiding the conveyor belt, and in the simplest form there are only a head and a tail pulley, both the conveying run of belt and the return run being substantially straight. The return run may pass over or under the tank, and extra pulleys may be provided to make the belt follow any desired path, for example to facilitate feeding and discharging the materials to and from the tank as will be understood.

The side edges of the belt run close to the sides of the tank or close to secondary walls provided in the tank to prevent solids from passing below the belt. In some cases the side edges of the belt may be substantially sealed for example by strips of resilient material held in position to engage the belt sides and the side wall members. These may be spring-loaded or under hydraulic or pneumatic pressure to ensure engagement.

The conveying belt may be flat across its width; or it may be troughed. In the latter case the belt is caused to run over side members which raise its edges, or in a concave trough which constrains the flexible belt to the required form. When troughed the belt forms a natural seal due to its edges being pressed up against the driving tension.

The invention will now be described by way of example with reference to the accompanying semi-diagrammatic drawings.

In the said drawings:

Fig. 1 is a longitudinal sectional elevation of a form of the invention comprising an inclined conveyor passing through a tank of decreasing depth.

Figs. 2 and 3 are alternative sections taken on the line C—C of Fig. 1.

Fig. 4 is a similar view to Fig. 1 showing a modified form of the tank.

Figs. 5 and 6 are sections taken on the line D—D of Fig. 4.

Fig. 7 is a sectional view of an alternate form of end seal.

Fig. 8 is a cross section of a form of apparatus in which a belt conveyor is driven by means of a chain.

Fig. 9 is a fragmentary longitudinal section to a reduced scale of the conveyor portion of Fig. 8.

Referring more particularly to the drawings, 17 is a tank having an inclined bottom, and 2 a rubber conveyor belt whose carrying portion 2a is introduced into the tank through a slit section which may be either flat as in Fig. 2 or curved as in Fig. 3 formed at the base of the end wall.

Mounted on the said end wall above the said slit section opening is a trailing sealing flap 17b of flexible material such as rubberised fabric, the length of the said flap being such that its lower end is at a substantial angle to the normal of the carrying portion 2a of the belt 2 on which it presses along a substantial strip area with continuously rubbing contact with the result that leakage between the carrying face of the belt and the end wall is reduced to a minimum so that the necessary hydrostatic head is easily maintained.

In this form the conveyor may be of the simplest form with driving and tail drums only, while the belt may be raised above the tank floor to leave a channel thereunder and means provided such as a pump 17c as shown in dotted lines, for circulating the liquid beneath the said belt. This form is particularly adapted for the gravity separation of coal and other minerals, and for this purpose liquid inlets 17d may be arranged at varying depths in the deep end wall as at 17d, and the floating material removed by rotary scrapers 18, 18¹ into the common transverse weir 17e, the material being fed into the deep end of the tank from the feed chute 12.

In the arrangement shown in Figs. 4 to 6, the tank 19 has running along its bottom a longitudinal opening, the edges of which have troughs 19a formed thereon with a plurality of supporting rollers 20 mounted between the said troughs for supporting the carrying portion of the belt, while sealing strips 21 may be arranged along the walls of the tank above the level of the belt as shown in Fig. 5, such sealing strips also functioning as deflectors to guide the material onto the belt. An alternative form of sealing "strip" particularly adapted for use with a troughed belt is shown in Fig. 6. This comprises laterally inclined metal strips 22 having inverted troughs formed at 23 in each of which is housed an inflated pneumatic tube 24 which presses on the belt. Any leakage is drained off by the troughs 19a, and if desired led to a sump (not shown) for pumping back to the tank. In addition to a single seal 25 on the inside of the tank for controlling the leakage between the entrance slot 19b, a labyrinth seal 26 comprising a plurality of resilient sealing members similar to the strip 25, and of similar form and individual action on the belt. The said sealing members are arranged in series so as to cause a progressive drop in the hydrostatic head of the liquid medium in the tank from the innermost to the outermost of said sealing members, thereby enabling a greater depth of liquid medium to be maintained with minimum breakage.

Fig. 7 shows an alternative form of end seal in which the belt, after passing through a labyrinth seal 36, is caused to pass between upper and lower inflated tubular seals 37 housed in troughs 38.

Figs. 8 and 9 show an arrangement for a tank similar to that shown in Figs. 4 and 5 but using a chain driven belt, the belt 39 being mounted on a chain 40 located in the longitudinal opening and driven by a sprocket 41 and supported by rollers 42 and 43, the former of which support the chain under the carrying portion of the belt and the latter the return portion of the belt. The advantage of this form is that owing to the positive drive of the chain small sprockets may be used as compared with the corresponding belt drums necessary for a friction drive for the belt, so that a more compact conveyor mechanism results.

In some tanks one or more belts may be provided.

Obviously many of the features shown in specific forms may be used in other forms where they are not shown; or, where shown they may be dispensed with when the operation performed does not require them as has already been mentioned in connection with the description of some of the figures of the drawings. Again, while straight runs of belt transporting surface are shown in the drawings, in conditions requiring a long immersion period for the sinks, the transporting surface may comprise a horizontal run and then an inclined run, with the belt passing under guide means where the horizontal run ends and the inclined run commences, although this has the drawback where the guide means are roller means, of having the latter immersed in the liquid.

We claim:

1. A tank for use in the float and sink separation of minerals by means of a liquid medium, said tank comprising two side walls, one end wall and an inclined floor, said end wall having an opening therein at a level corresponding to that of the floor, means for feeding and maintaining a body of liquid medium in said tank of a depth sufficient for float and sink separation to take place, means for feeding solid material to be separated into said tank, an imperforate homogeneously pliant endless conveyor belt having a carrying portion extending from outside said tank through the opening in said end wall over and supported upon said floor up at least to the liquid level in said tank for discharging material settled thereon, said carrying portion of said belt having a substantially smooth surface, multistage sealing means mounted on said end wall about said opening and comprising a plurality of resilient sealing members arranged in series lengthwise of the conveyor, said sealing means pressing with continuously rubbing contact on said carrying portion to cause a progressive drop in the hydrostatic head of the liquid medium in the tank from the innermost to the outermost of said sealing members, thereby enabling a greater depth of liquid medium to be maintained with minimum leakage, and means including paddles mounted in said tank at the liquid level for removing floats on said liquid.

2. A tank for use in the float and sink separation of minerals by means of a liquid medium, said tank comprising two side walls, one end wall and an inclined floor, said end wall having an opening therein at a level corresponding to that of the floor, means for feeding and maintaining a body of liquid medium in said tank of a depth sufficient for float and sink separation to take place, means for feeding solid material to be separated into said tank, an imperforate homogeneously pliant endless conveyor belt having a troughed carrying portion extending from outside said tank through the opening in said end wall over and supported upon said floor up at least to the liquid level in said tank for discharging material settled thereon, said carrying portion of said belt having a substantially smooth surface, multistage sealing means mounted on said end wall about said opening and comprising a plurality of resilient sealing members arranged in series lengthwise of the conveyor, said sealing means pressing with continuously rubbing contact on said carrying portion to cause a progressive drop in the hydrostatic head of the liquid medium in the tank from the innermost to the outermost of said sealing members, thereby enabling a greater depth of liquid medium to be maintained with minimum leakage, and means including paddles mounted in said tank at the liquid level for removing floats on said liquid.

3. A tank for use in the float and sink separation of minerals by means of a liquid medium, said tank comprising two side walls, one end wall and an inclined floor, said end wall having an opening therein at a level corresponding to that of the floor, means for feeding and maintaining a body of liquid medium in said tank of a depth sufficient for float and sink separation to take place, means for feeding solid material to be separated into said tank, an imperforate homogeneously pliant endless conveyor belt having a carrying portion extending from outside said tank through the opening in said end wall over and supported upon said floor up at least to the liquid level in said tank for discharging material settled thereon, said carrying portion of said belt having a substantially smooth surface, said floor having formed therein a longitudinal central opening, a plurality of rollers mounted in said opening for supporting the middle of said carrying portion, multistage sealing means mounted on said end wall about said opening and comprising a plurality of resilient sealing members arranged in series lengthwise of the conveyor, said sealing means pressing with continuously rubbing contact on said carrying portion to cause a progressive drop in the hydrostatic head of the liquid medium in the tank from the innermost to the outermost of said sealing members, thereby enabling a greater depth of liquid medium to be maintained with minimum leakage, and means including paddles mounted in said tank at the liquid level for removing floats on said liquid.

4. A tank for use in the float and sink separation of minerals by means of a liquid medium, said tank comprising two side walls, one end wall and an inclined floor, said end wall having an opening therein at a level corresponding to that of the floor, means for feeding and maintaining a body of liquid medium in said tank of a depth sufficient for float and sink separation to take place, means for feeding solid material to be separated into said tank, an imperforate homogeneously pliant endless conveyor belt having a carrying portion extending from outside said tank through the opening in said end wall over and supported upon said floor up at least to the liquid level in said tank for discharging material settled thereon, said carrying portion of said belt having a substantially smooth surface, multistage sealing means mounted on said end wall about said opening and comprising a plurality of resilient sealing members arranged in series lengthwise of the conveyor, said sealing means pressing with continuously rubbing contact against said carrying portion to cause a progressive drop in the hydrostatic head of the liquid medium in the tank from the innermost to the outermost of said sealing members, thereby enabling a greater depth of liquid medium to be maintained with minimum leakage, and means including paddles mounted in said tank at the liquid level for removing floats on said liquid, said multiple seal including a plurality of flexible elements contacting the upper and lower surfaces of the belt and upper and lower inflated tubular seals engaging the upper and lower surfaces of said belt.

WILLIAM SCHOLES.

REFERENCES CITED

The following references are of record in the file of this patent:

UNITED STATES PATENTS

| Number | Name | Date |
| --- | --- | --- |
| 519,316 | Besly | May 8, 1894 |
| 615,424 | Brown | Dec. 6, 1898 |
| 893,368 | Quigley | July 14, 1908 |
| 2,200,771 | Dyer | May 14, 1940 |
| 2,314,542 | Kern | Mar. 23, 1943 |

FOREIGN PATENTS

| Number | Country | Date |
| --- | --- | --- |
| 134,596 | Great Britain | Nov. 3, 1919 |